US008209670B2

(12) United States Patent
Matsuo et al.

(10) Patent No.: US 8,209,670 B2
(45) Date of Patent: Jun. 26, 2012

(54) PROGRAM CONVERSION PROGRAM, PROGRAM CONVERSION APPARATUS AND PROGRAM CONVERSION METHOD

(75) Inventors: Akihiko Matsuo, Kawasaki (JP); Manabu Kamimura, Kawasaki (JP); Kenichi Kobayashi, Kawasaki (JP); Toshiaki Yoshino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1576 days.

(21) Appl. No.: 11/336,917

(22) Filed: Jan. 23, 2006

(65) Prior Publication Data

US 2007/0089099 A1  Apr. 19, 2007

(30) Foreign Application Priority Data

Oct. 14, 2005  (JP) .................. 2005-299891

(51) Int. Cl.
 *G06F 9/44* (2006.01)
(52) U.S. Cl. ........ 717/131; 717/126; 717/127; 717/130; 717/137
(58) Field of Classification Search ........................ None
See application file for complete search history.

(56) References Cited

U.S. PATENT DOCUMENTS

| | | | | |
|---|---|---|---|---|
| 5,285,387 A | * | 2/1994 | Kurahara et al. | 715/205 |
| 5,339,431 A | * | 8/1994 | Rupp et al. | 717/162 |
| 5,381,548 A | * | 1/1995 | Matsuo | 717/107 |
| 5,507,030 A | * | 4/1996 | Sites | 717/136 |
| 5,701,490 A | * | 12/1997 | Safonov | 717/143 |
| 5,920,722 A | * | 7/1999 | Damron | 717/159 |
| 5,978,587 A | * | 11/1999 | Baisley et al. | 717/144 |
| 6,029,002 A | * | 2/2000 | Afifi et al. | 717/131 |
| 6,041,177 A | * | 3/2000 | Kawabe et al. | 717/125 |
| 6,110,224 A | * | 8/2000 | Kawabe et al. | 717/131 |
| 6,351,848 B1 | * | 2/2002 | Chessin | 717/140 |
| 6,438,745 B1 | * | 8/2002 | Kanamaru et al. | 717/137 |

(Continued)

FOREIGN PATENT DOCUMENTS

JP  2002-215391  8/2002

OTHER PUBLICATIONS (PTO 09-8211 (English translation of Japanese Publication No. 2002215391) Name : Program Analysis Device, Program Analysis Method and Recording Medium. Date of Publication :Aug. 2, 2002.*

(Continued)

*Primary Examiner* — Thuy Dao
*Assistant Examiner* — Ziaul A Chowdhury
(74) *Attorney, Agent, or Firm* — Fujitsu Patent Center

(57) ABSTRACT

A program conversion program, a program conversion apparatus and a program conversion method that conversions a program having different process according to the content of an argument into a program which facilitate the analysis are provided. The program conversion apparatus includes a dedicated call destination program generating unit that detects the call destination program, an argument for differentiating the processes of the call destination program and the content of the argument from the program group and generates a program for executing only a process according to the content of the argument of the processes of the call destination program as the dedicated call destination program for each argument and each content of the argument, and a call source program rewriting unit that detects the call position for calling the call destination program from the program group and rewrites the call position to call the dedicated call destination program generated by the dedicated call destination program generating unit.

18 Claims, 17 Drawing Sheets

U.S. PATENT DOCUMENTS

| | | | |
|---|---|---|---|
| 6,636,880 B1* | 10/2003 | Bera | 708/206 |
| 6,807,548 B1* | 10/2004 | Kemper | 707/103 R |
| 6,829,772 B2* | 12/2004 | Foote et al. | 719/330 |
| 7,120,902 B2* | 10/2006 | Flanagan et al. | 717/130 |
| 7,152,229 B2* | 12/2006 | Chong et al. | 717/146 |
| 7,254,807 B2* | 8/2007 | Sakata et al. | 717/136 |
| 2003/0037316 A1* | 2/2003 | Kodosky et al. | 717/127 |
| 2004/0261057 A1* | 12/2004 | Shinomi | 717/114 |
| 2006/0075389 A1* | 4/2006 | Itoh et al. | 717/126 |
| 2006/0130012 A1* | 6/2006 | Hatano et al. | 717/136 |
| 2006/0156292 A1* | 7/2006 | Nagashima et al. | 717/136 |
| 2007/0089099 A1* | 4/2007 | Matsuo et al. | 717/136 |

OTHER PUBLICATIONS

"Safe Class and Data Evolution in Large and Long-Lived Java™ Applications", Mikhail Dmitriev, [Online], 2001, pp. 1-212, [Retrieved from Internet on Apr. 5, 2012], <http://delivery.acm.org/10.1145/980000/975002/smli_tr-2001-98.pdf>.*

"XMem: Type-Safe, Transparent, Shared Memory for Cross-Runtime Communication and Coordination", MichalWegiel, [Online], 2008, pp. 327-338, [Retrieved from Internet on Apr. 5, 2012], <http://delivery.acm.org/10.1145/1380000/1375621/p327-wegiel.pdf>.*

"Testing for Software Vulnerability Using Environment Perturbation", Wenliang Du et al., [Online], 2002, pp. 1-12, [Retrieved from Internet on Apr. 5, 2012], <http://citeseerx.ist.psu.edu/viewdoc/download?doi=10.1.1.11.4464&rep=rep1&type=pdf>.*

"Version Models for Software Configuration Management", Reidar Conradi et al., [Online], 1998, pp. 232-282, [Retrieved from Internet on Apr. 5, 2012], <http://delivery.acm.org/10.1145/290000/280280/p232-conradi.pdf>.*

* cited by examiner

FIG.11

| ROUTINE NAME | ARGUMENT POSITION | VALUE | REWRITTEN ROUTINE NAME |
|---|---|---|---|
| SUB1 | 1 | 1 | SUB1-KUBUN-1 |
| SUB1 | 1 | 2 | SUB1-KUBUN-2 |
| SUB1 | 1 | 3 | SUB1-KUBUN-3 |
| SUB1 | 1 | 4 | SUB1-KUBUN-4 |

FIG.14

PRE-CONVERSION PROGRAM

```
MAIN PROCESSING SECTION
    MOVE '2' TO KUBUN.
      IF RECNO OF DATAREC < 0 THEN
      MOVE '3' TO KUBUN
      ADD 1 TO ID OF REC
    END-IF.
      CALL 'SUB1' USING KUBUN REC.
    EXIT.
```

FIG.15

CONVERTED PROGRAM

```
MAIN PROCESSING SECTION
   MOVE '2' TO KUBUN.
     IF RECNO OF DATAREC < 0 THEN
     MOVE '3' TO KUBUN
     ADD 1 TO ID OF REC
   END-IF.
     EVALUATE KUBUN
   WHEN '2'    * TWO ROWs
     CALL 'SUB1-KUBUN-2' USING KUBUN REC
   WHEN '3'    * FOUR ROWs
     CALL 'SUB1-KUBUN-3' USING KUBUN REC
   END-EVALUATE
   EXIT.
```

FIG.18

PRE-CONVERSION PROGRAM

```
class MyFigure() {
   public MyFigure() {
      Figure a = new Circle(100, 100, 50);
      AddFigure(a);

Figure b = new Box(50, 50, 150, 150);
      AddFigure(b);
   } private void AddFigure(Figure f) {
      list.add(f);
      f.Draw();
   }
}
```

CONVERTED PROGRAM

```
class MyFigure() {
   public MyFigure() {
      Figure a = new Circle(100, 100, 50);
      AddFigure((Circle)a);

Figure b = new Box(50, 50, 150, 150);
      AddFigure((Box)b);
   } private void AddFigure(Figure f) {
      list.add(f);
      f.Draw();
   } private void AddFigure(Circle f) {
      list.add(f);
      f.Draw();
   } private void AddFigure(Box f) {
      list.add(f);
      f.Draw();
   }
}
```

PROGRAM CONVERSION PROGRAM, PROGRAM CONVERSION APPARATUS AND PROGRAM CONVERSION METHOD

BACKGROUND OF THE INVENTION

1. Field of the Invention

The present invention relates to a program conversion program, a program conversion apparatus and a program conversion method which facilitate the analysis of a program in which a process is different according to the content of an argument.

2. Description of the Related Art

A business application program adapted to systematize an enterprise basic business has a large scale of a program. The business application program has been developed by spending a lot of manpower and time. Further, such a program is maintained and operated for a long period of time. The program is required for a high quality. Further, the program has features that corrections are frequently performed due to change, etc., of business.

Several problems exist in the maintenance of such a program. First, there is a case that a person in charge of the maintenance is replaced. Accordingly, the maintenance of the program cannot depend on a personal skill. Further, the scale of the program is large, and the grasp of the entire image of the program is not easy. A specification does not reflect correctly the present situation of the program in many cases due to perfunctory maintenance. When the program is corrected, it is necessary to perform a large scale of tests to know the influence of the correction.

To deal with these problems, a reverse engineering tool having functions of creating a specification of the program by analyzing the program or extracting call relation among programs data relation, etc., is utilized. For example, to grasp the processing contents of the program in the maintenance of the program, it is frequently performed to show the processing route in the program, the call relation of a subroutine as a call relation diagram.

FIG. 1 is a source code showing an example of a program using an access routine. This program is written by a COBOL language and has a call source program and a call destination program. Here, the call destination program is a subroutine. Further, FIG. 19 is a view showing an example of a call relation diagram displayed by a conventional reverse engineering tool. This call relation diagram is of the program in FIG. 1 and is obtained by the conventional reverse engineering tool.

In the program of FIG. 1, a function of accessing a certain file is realized by one subroutine of the call destination program. Input and output processes, such as a reading process, a writing process, etc., are switched by an argument KUBUN indicating a process partition. In such a case, even when the call relation diagram is merely observed, it cannot be judged if reading is performed or writing is performed there. For example, it cannot be judged from the call relation diagram of FIG. 19 that only an OPEN process is executed in the calling from the previous process. Accordingly, it is necessary that a person confirms by observing the source code of the corresponding position.

Such a view is useful when the process in the subroutine is constant. However, in such a case that the process in the subroutine is changed largely according to an argument, etc., there is a problem that it is not possible to grasp what kind of process is actually executed only by the call relation diagram. Further, a conventional static analysis tool is used for not only the display of the call relation diagram, but also various applications such as an analysis, etc. of input/output of data. However, there is a large problem that the process contents of the program having the process partition cannot be grasped only by this tool. This became a large cause for obstructing development and maintenance works.

As a conventional art relating to the present invention, for example, Patent Document 1 (Jpn. Pat. Appln. Laid-Open Publication No. 2002-215391) is known. To solve the above-mentioned problems, the program analyzing apparatus, program analyzing method and recording medium analyze whether the value of an argument at the call position can be specified. Then, only the route to be executed in the case of this value is extracted, and the call relation diagram is displayed.

However, the technique of the above-mentioned Patent Document 1 needs to perform complicated analysis based on an accurate syntax analysis. Accordingly, it is not easy to remodel an existing reverse engineering tool, such as a call relation diagram generation tool, a program specification generation tool, a program and data relation information extraction tool, a program and data relation information extraction tool, etc., to incorporate the technique of the Patent Document 1 in the existing reverse engineering tool. This technique is not generally used.

Even if the call relation diagram can be displayed, the above-mentioned other reverse engineering tool cannot be utilized.

SUMMARY OF THE INVENTION

The present invention is made to solve the above-mentioned problems. An object of the present invention is to provide a program conversion program, a program conversion apparatus and a program conversion method which convert the program in which the process is different according to the contents of the argument, into the program in which the analysis is easy.

To solve the above-mentioned problems, the present invention provides a program conversion program having a call source program and a call destination program, and allowing a computer to execute the conversion of a program group having different processes of the call destination program according to the content of the argument used by the call source program for calling the call destination program, the program comprising: a dedicated call destination program generating step that detects the call destination program, an argument for differentiating the processes of the call destination program, and the content of the argument from the program group and generates a program for executing only a process according to the content Of the argument of the processes of the call destination program as dedicated call destination program for each argument and each content of the argument; and a call source program rewriting step that detects a call position for calling the call destination program from the program group and rewrites the call position to call the dedicated call destination program generated in the dedicated call destination program generating step.

In the program conversion program according to the present invention, when a value that the argument can take is limited by detecting the value that the argument can take and that is used for calling the call destination program in the call source program, the call source program rewriting step rewrites the call position to call the dedicated call destination program corresponding to each value that the argument can take.

In the program conversion program according to the present invention, the dedicated call destination program generating step and the call source program rewriting step use the dedicated call destination program name generated according to the argument and the content Of the argument.

In the program conversion program according to the present invention, the dedicated call destination program generating step generates the dedicated call destination program by deleting the process which is not executed according to the content of the argument of the content of the call destination program.

In the program conversion program according to the present invention, the content of the argument is the value of the argument. The call destination program is different in the process according to the value of the argument. The dedicated call destination program generating step generates the dedicated call destination program for each value of the argument.

In the program conversion program according to the present invention, the content of the argument is a class of the argument. The call destination program is different in the process according to the class of the argument. The dedicated call destination program generating step generates the dedicated call destination program for each class of the argument.

Furthermore, the present invention provides a program conversion apparatus having a call source program and a call destination program and converting a program group having different processes of the call destination program according to the content of an argument used by the call source program for calling the call destination program, the apparatus comprising: a dedicated call destination program generation unit that detects the call destination program, an argument for differentiating the processes of the call destination program and the content of the argument from the program group, and generates a program for executing only a process according to the content of the argument of the processes of the call destination program as dedicated call destination program for each argument and each content of the argument; and a call source program rewriting unit that detects a call position for calling the call destination program from the program group, and rewrites the call position to call the dedicated call destination program generated by the dedicated call destination program generation unit.

In the program conversion apparatus according to the present invention, the call source program rewriting unit detects the value that the argument can take and that is used for calling the call destination program in the call source program. Thereby, when the value that the argument can take can be limited, the call position is rewritten to call the dedicated call destination program corresponding to each value that the argument can take.

In the program conversion apparatus according to the present invention, the dedicated call destination program generation unit and the call source program rewriting unit use the dedicated call destination program name generated according to the argument and the content of the argument.

In the program conversion apparatus according to the present invention, the dedicated call destination program generation unit generates the dedicated call destination program by deleting the process which is not executed according to the content of the argument of the content of the call destination program.

In the program conversion apparatus according to the present invention, the content of the argument is the value of the argument. The call destination program is different in the process according to the value of the argument. The dedicated call destination program generation unit generates the dedicated call destination program for each value of the argument.

In the program conversion apparatus according to the present invention, the content of the argument is a class of the argument. The call designation program is different in the process according to the class of the argument. The dedicated call designation program generation unit generates the dedicated call destination program for each class of the argument.

Furthermore, the present invention provides a program conversion method including a call source program and a call destination program and executing the conversion of a program group having different processes of the call destination program according to the content of an argument used by the call source program for calling the call destination program, the method comprising: a dedicated call destination program generating step that detects the call destination program, an argument for differentiating the processes of the call destination program and the content of the argument from the program group, and generates a program for executing only the process according to the content of the argument of the processes of the call destination program as dedicated call destination program for each argument and each content of the argument; and a call source program rewriting step that detects a call position for calling the call destination program from the program group, and rewrites the call position to call the dedicated call destination program generated in the dedicated call destination program generation step.

When the program conversion of the present invention is executed, a process content is easily understood in the source code. Further, the result of the program conversion can be utilized without tampering with the existing static analysis tool. The process content can be more easily understood.

BRIEF DESCRIPTION OF THE DRAWINGS

FIG. 11 is a table showing an example of a dedicated routine list according to the present invention;

FIG. 14 is a source code showing an example of a program before conversion that the value of the process partition argument becomes plural according to the present invention;

FIG. 15 is a source code showing an example of a converted program outputted by the call position rewriting process according to the present invention;

FIG. 18 is a source code showing an example of a transformed result by a program conversion apparatus according to the present invention for a program written by an object oriented language.

DETAILED DESCRIPTION OF THE PREFERRED EMBODIMENTS

Figure 1:
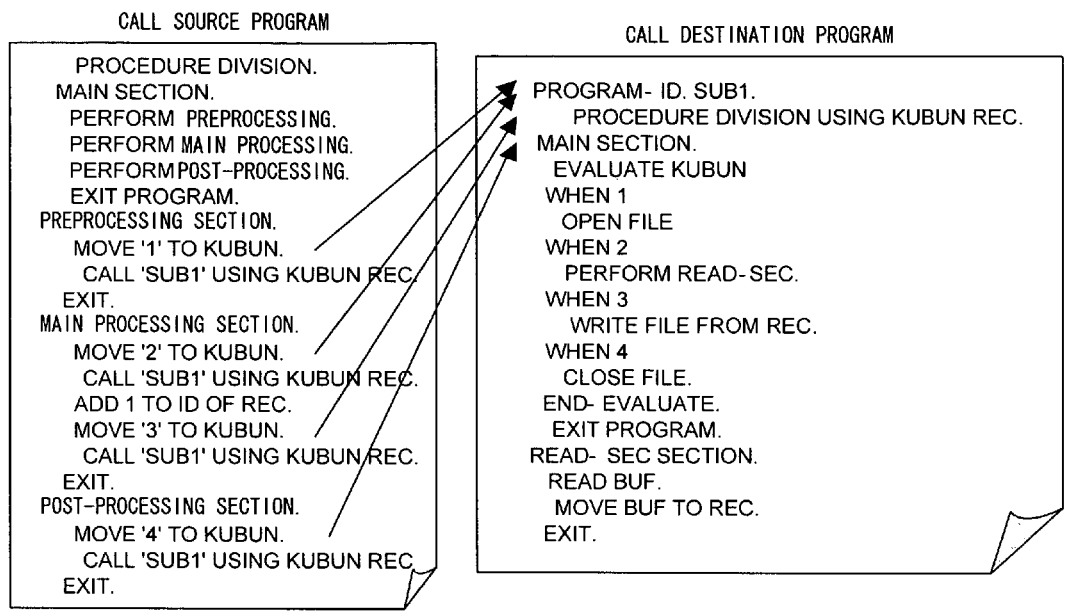
FIG. 1 is a source code showing an example of a program using an access routine.

Embodiments of the present invention will be described by referring to the drawings.

First Embodiment

In the first embodiment, a program conversion apparatus for converting a program written by the COBOL language will be described.

First, a configuration of a program conversion apparatus according to the present invention will be described.

Figure 2:
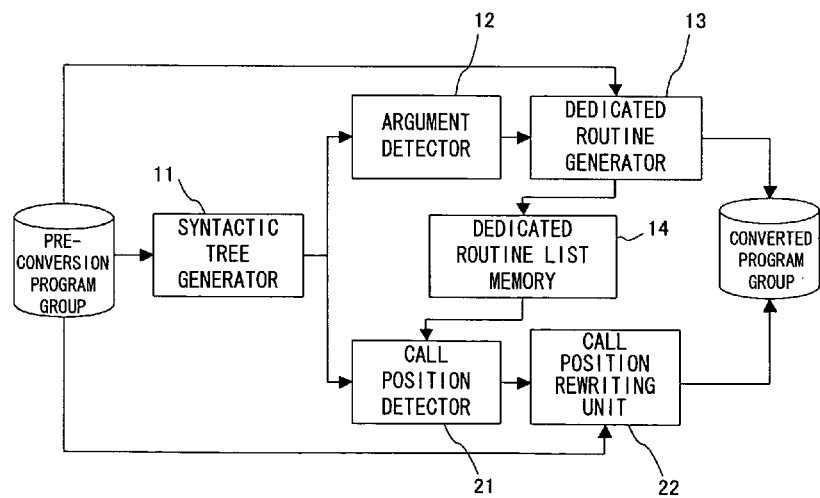
FIG. 2 is a block diagram showing an example of a configuration of a program conversion apparatus according to the present invention.

FIG. 2 is a block diagram showing an example of a configuration of a program conversion apparatus according to the present invention. The program conversion apparatus comprises a syntactic tree generator 11, an argument detector 12, a dedicated routine generator 13, a dedicated routine list memory 14, a call position detector 21, and a call position rewriting unit 22. A set of the program before conversion by the program conversion apparatus is called a pre-conversion program, and a set of the converted program is called a converted program group. In this embodiment, the program of FIG. 1 will be mainly described as a pre-conversion program group.

Then, an operation of the program conversion apparatus according to the present invention will be descried.

Figure 3:
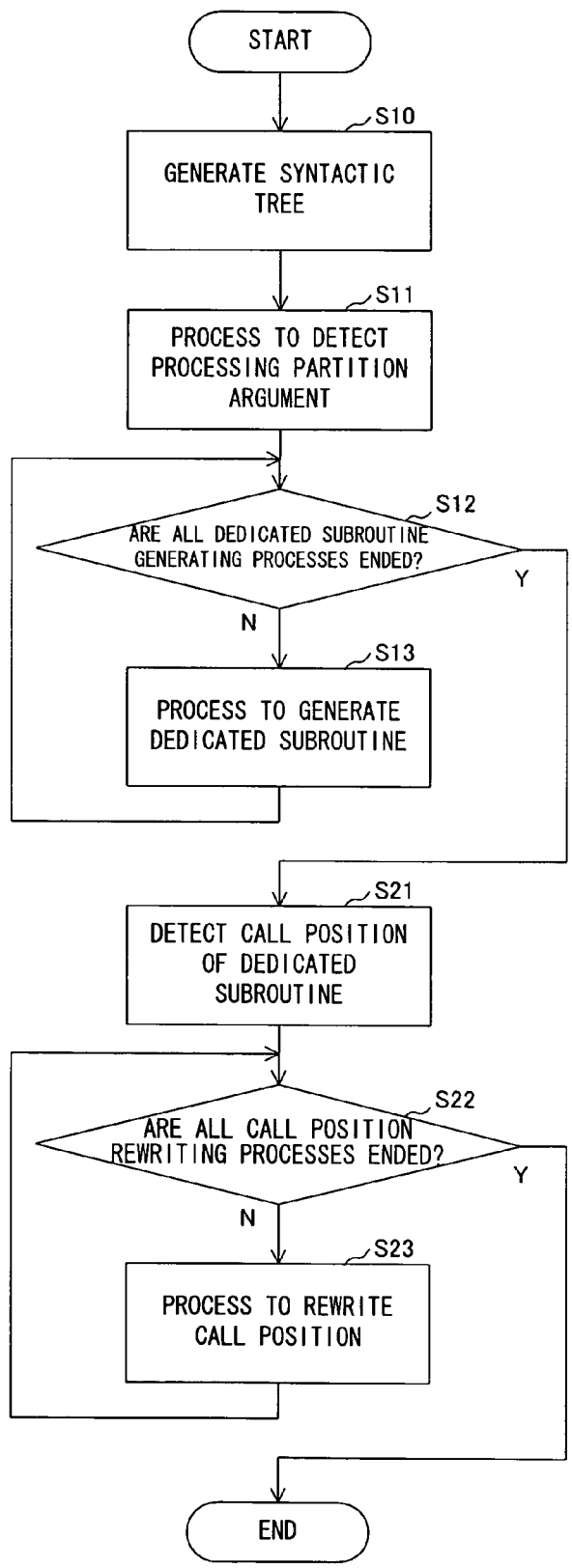
FIG. 3 is a flowchart showing an example of an operation of the program conversion apparatus according to the present invention.
Figure 4:
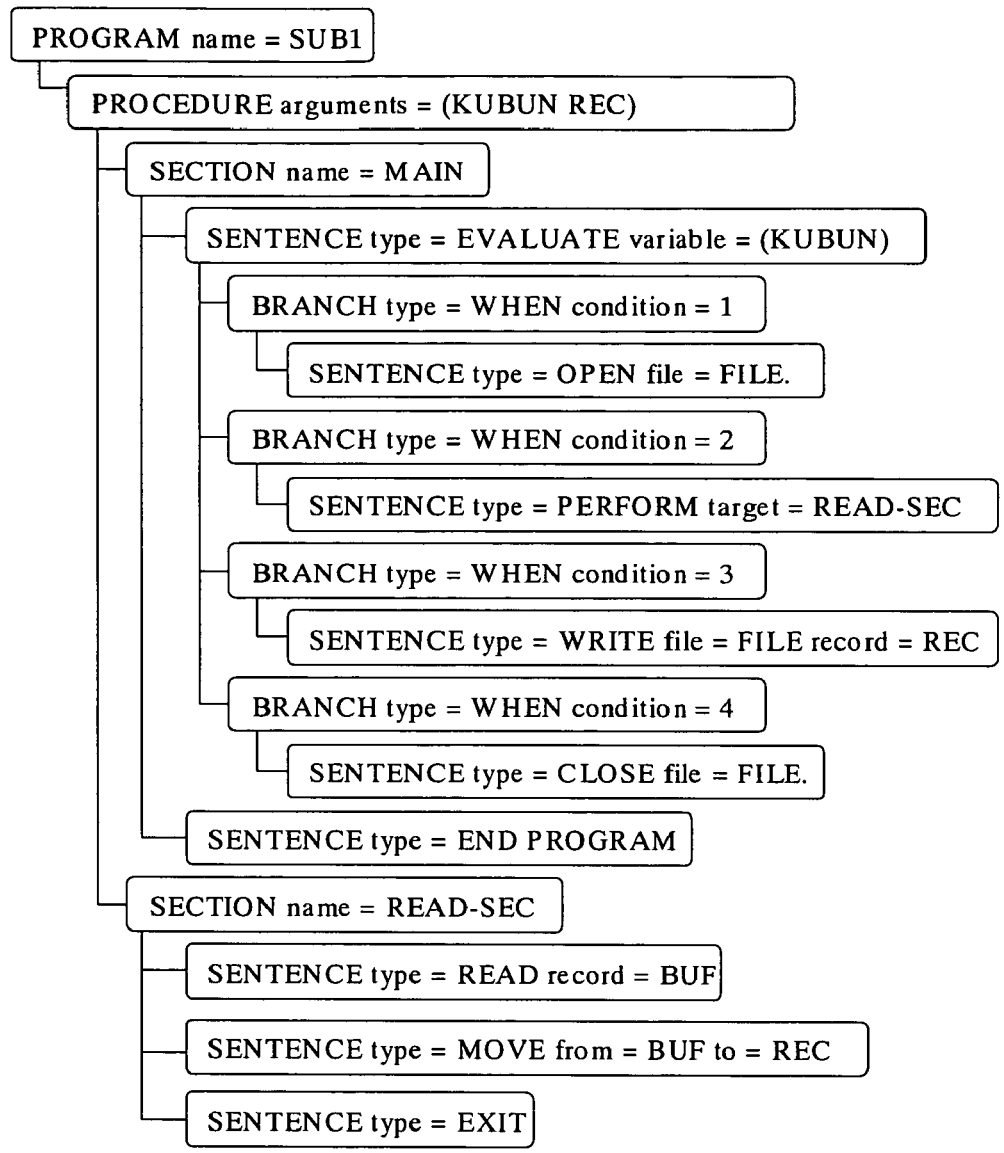
FIG. 4 is a flowchart showing an example of a syntactic tree.

FIG. 3 is a flowchart showing an example of an operation of the program conversion apparatus according to the present invention. First, the syntactic tree generator 11 acquires a program before conversion, and generates a syntactic tree (S10). The syntactic tree generator 11 is also called a parser. The syntactic tree generator 11 executes a syntax analysis, thereby displaying all the sentences in the program as a syntactic tree. The argument detector 12 and the call position detector 21 use this syntactic tree, and can refer to a variable in a process partition argument program, and information of a sentence. FIG. 4 is a flowchart showing an example of the syntactic tree. This syntactic tree is generated for the call destination program of FIG. 1.

Subsequently, the argument detector 12 performs a process partition argument detecting process for detecting a process partition argument, a process partition argument value, and the subroutine having the process partition argument from all the programs in the pre-conversion program group (S11).

Then, the dedicated routine generator 13 judges whether the dedicated subroutine generating process for all the subroutine, the process partition argument, the process partition argument value extracted by the argument detector 12 is finished (S12). When the dedicated subroutine generating process is finished (Y in S12), the dedicated subroutine generator 13 shifts to the process S21. On the other hand, when the dedicated subroutine generating process is not finished (N in S12), the dedicated routine generator 13 performs the dedicated subroutine generating process for next subroutine, a process partition argument and a process partition argument value (S13), and returns to the process S12.

Then, the call position detector 21 performs a call position detecting process for detecting a call position for all the dedicated subroutines generated by the dedicated routine generator 13 from all the programs in the pre-conversion program (S21). Subsequently, the call position rewriting unit 22 judges whether the call position rewriting process is finished for all the call positions detected by the call position detector 21 (S22). When the call position rewriting process is finished (Y in S22), this flow is finished. On the other hand, when the call position rewriting process is not finished (N in S22), the call position rewriting unit 22 performs the call position rewriting process for next dedicated subroutine (S23), and returns to the process S22.

Then, a process partition argument detecting process will be described.

As the process partition argument detecting process, the argument detector 12 performs a process partition argument detecting process for detecting a process partition argument, etc., when the value of the argument in the subroutine is referred as it is, and a second process partition argument detecting process for detecting a process partition argument, etc., when the value of the argument in the subroutine is once transferred to another variable. Further, the case that the value of another variable is set according to the value of the argument may be detected.

Figure 5:
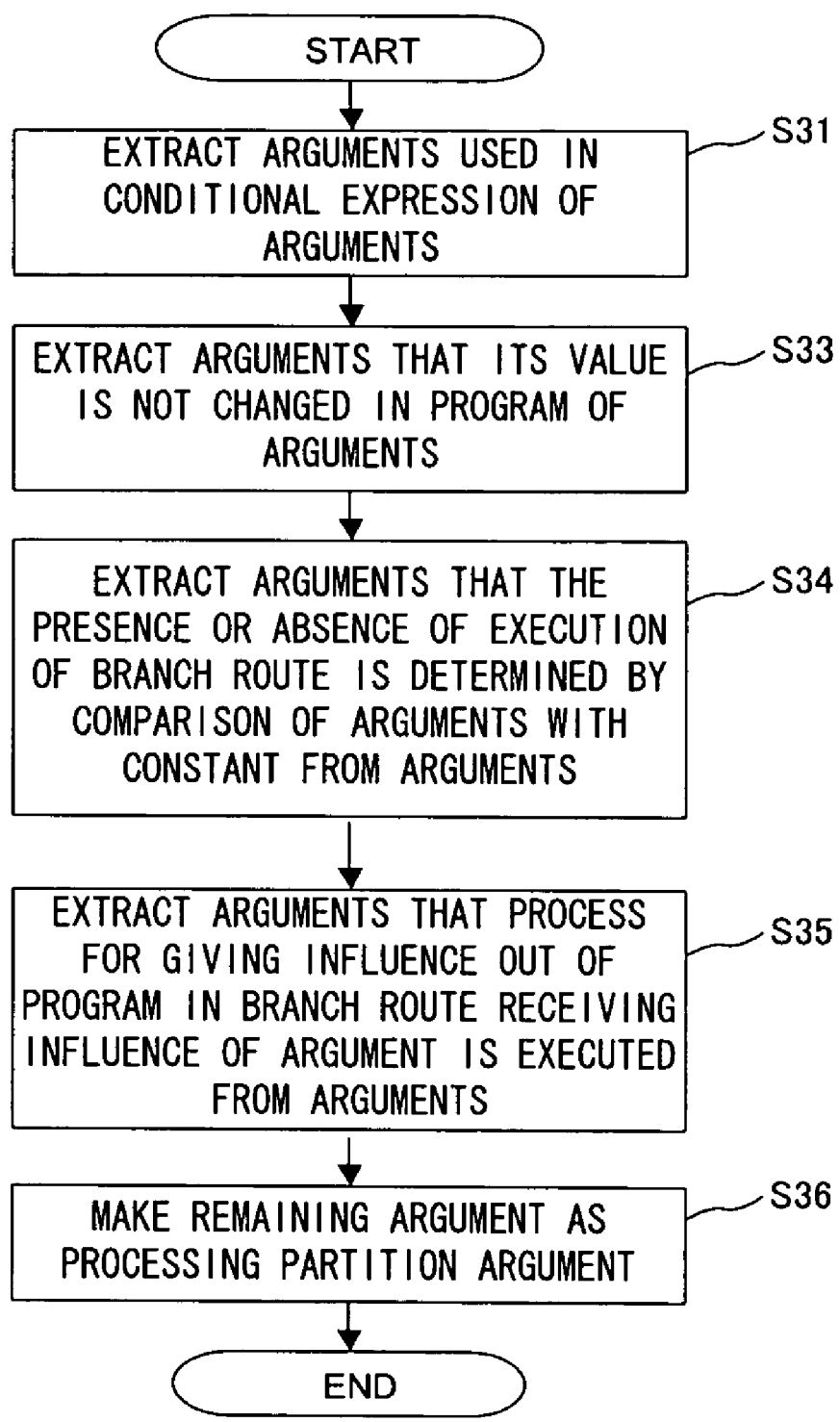
FIG. 5 is a flowchart showing an example of an operation of a first process partition argument detecting process according to the present invention.

FIG. 5 is a flowchart showing an example of an operation of a first process partition argument detecting process according to the present invention. First, the argument detector 12 extracts arguments used for the conditional expression from the arguments (S31). Then, the argument detector 12 extracts arguments each of which value is not changed in the program from the extracted arguments (S33). Then, the argument detector 12 extracts arguments that the presence or absence of execution of a branch route is determined by a comparison of the argument with a constant from the extracted arguments (S34). Then, the argument detector 12 extracts arguments executed by the process for giving influence out of the program in the branch route receiving the influence of the argument from the extracted arguments (S35). The argument detector 12 then sets the retaining argument as a process partition argument. The argument detector 12 then outputs the value of the process partition argument and the subroutine having the process partition argument together with the process partition argument (S36). Then, this flow is finished.

Figure 6:
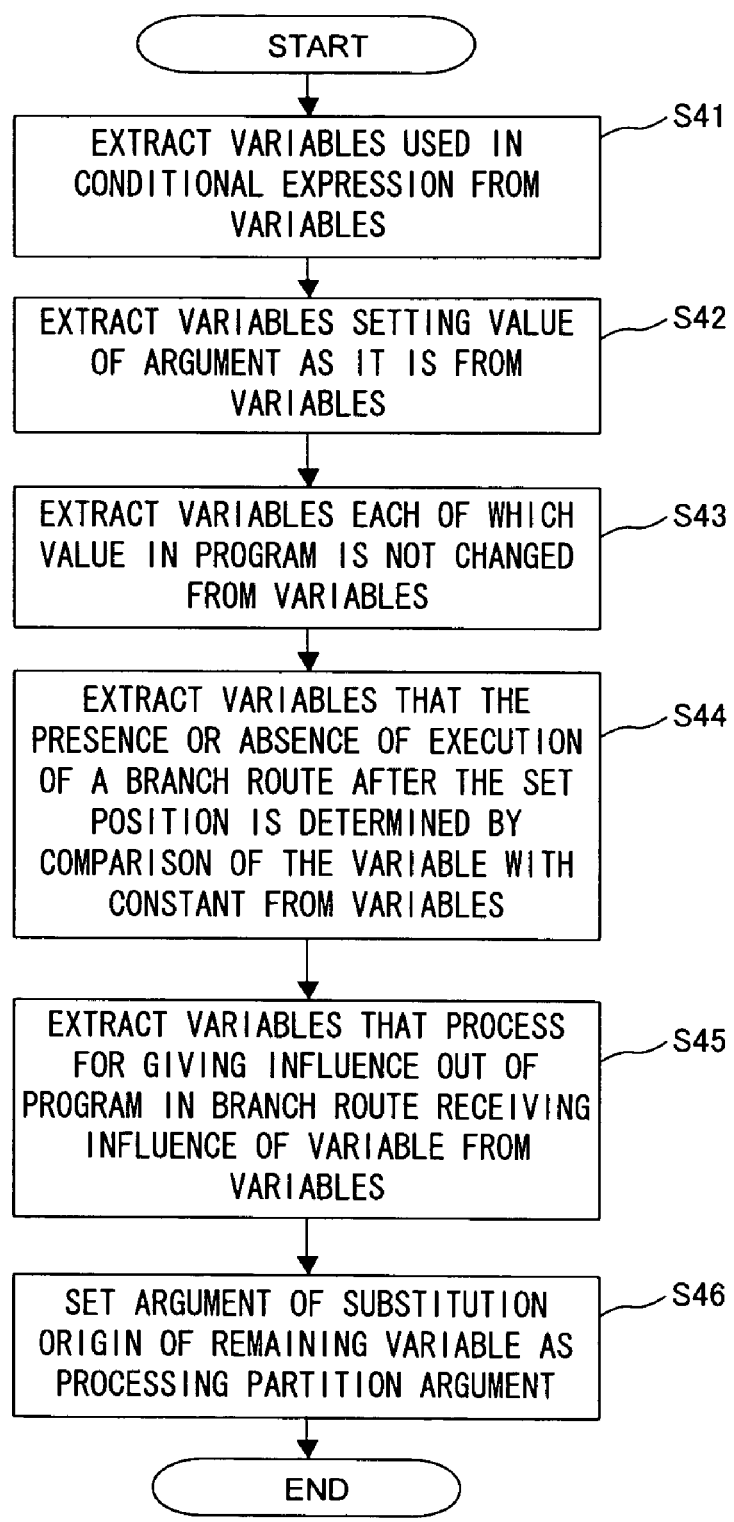
FIG. 6 is a flowchart showing an example of an operation of a second process partition argument detecting process according to the present invention.

FIG. 6 is a flowchart showing an example of an operation of a second process partition argument detecting process according to the present invention. First, the argument detector 12 extracts variables used in the conditional expression from the variables (S41). Then, the argument detector 12 extracts variables set with the value of the argument from the extracted variables (S42). Then, the argument detector 12 extracts variables each of which value in the program is not changed from the extracted variables (S43). Then, the argument detector 12 extracts variables that the presence or absence of execution of a branch route after the set position is determined by a comparison of the variable with a constant from the extracted variables (S44). Thereafter, the argument detector 12 extracts variables that the process for giving influence out of the program in the branch route receiving the influence of the variable from the extracted variables (S45). The argument detector 12 then sets the argument of the substitution origin of the retaining variable as a process partition argument. The argument detector 12 then outputs the value of the process partition argument and the subroutine having the process partition argument together with the process partition argument (S46). Then, the argument detector 12 finishes this flow.

Subsequently, the dedicated subroutine generating process will be described.

Here, the subroutine having the process partition argument detected by the argument detector 12 is called a pre-conversion subroutine. As the dedicated subroutine generating process, a first dedicated subroutine generating process for generating the dedicated subroutine from the pre-conversion subroutine used with the value of the argument as a process partition, and a second dedicated subroutine generating process for generating the dedicated subroutine from the pre-conversion subroutine using the value of the argument as the argument of another dedicated subroutine as it is, are executed.

Figure 7:
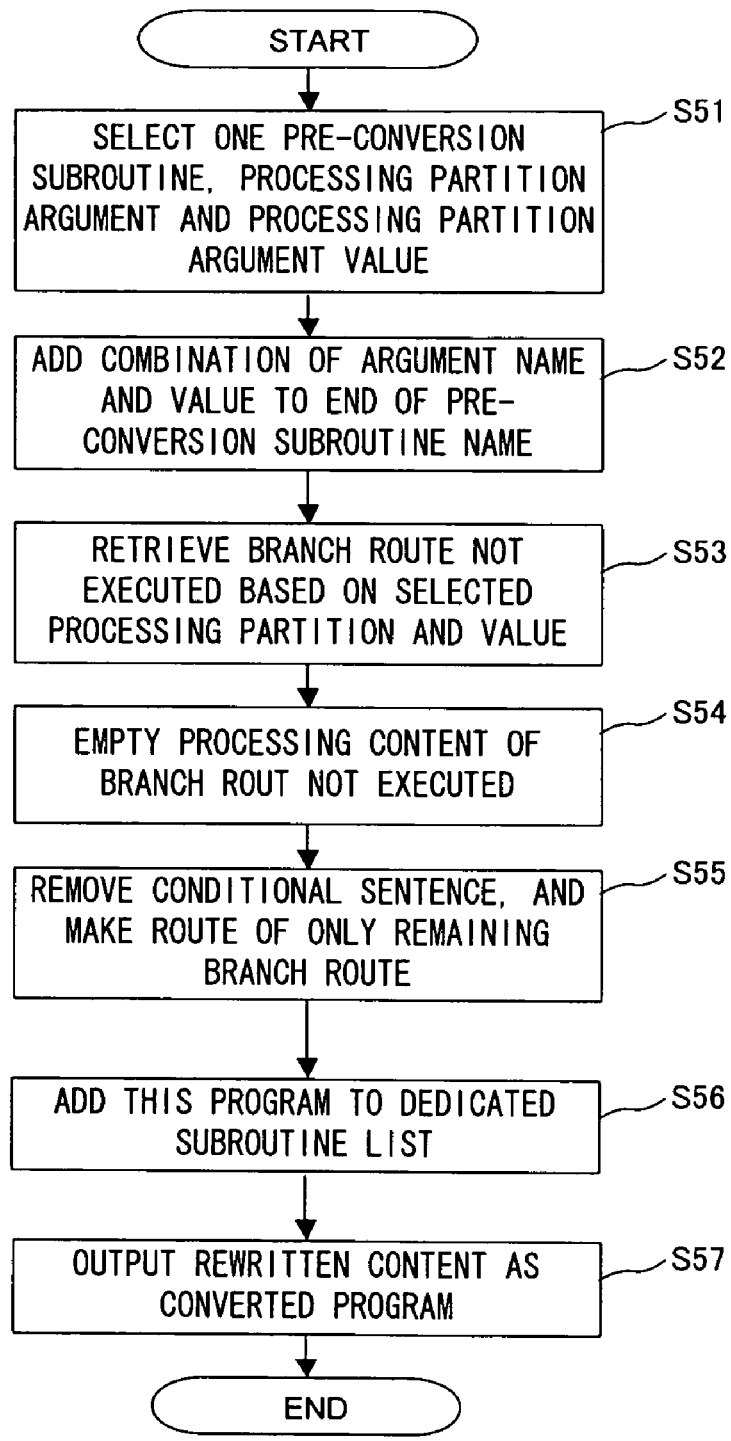
FIG. 7 is a flowchart showing an example of an operation of a first dedicated subroutine generating process according to the present invention.

FIG. 7 is a flowchart showing an example of the first dedicated subroutine generating process according to the present invention. First, the dedicated routine generator 13 selects one process partition argument outputted by the argument detector 12 and its value (S51). Then, the dedicated routine generator 13 adds a combination of a process partition argument name and value to the end of the pre-conversion subroutine to be an object, and generates a dedicated subroutine name (S52). Thereafter, the dedicated routine generator 13 retrieves the branch route which is not executed under the selected process partition and value (S53). The dedicated routine generator 13 empties the process content of the branch route which is not executed (S54). The dedicated routine generator 13 removes the condition sentence with only one branch route, and retains a route of only the retaining branch route (S55). Then, the dedicated routine generator 13 adds the information of this dedicated subroutine to the dedicated routine list of the dedicated routine list memory 14 (S56). The dedicated routine generator 13 outputs the rewritten contents as the converted program (S57). Then, the dedicated routine generator 13 finishes this flow.

Incidentally, in this flow, when the branch route is uniquely determined, the condition sentence is removed. However, in the language that a side effect of the execution exists in the condition sentence, the condition sentence is not removed.

Further, in the case of the subroutine having a plurality of process partitions, dedicated subroutines corresponding to the combinations of the respective values are generated. However, the amount of generation of the converted program may be reduced by selecting only the subroutine called actually, and outputting the subroutine as the converted program.

Figure 8:
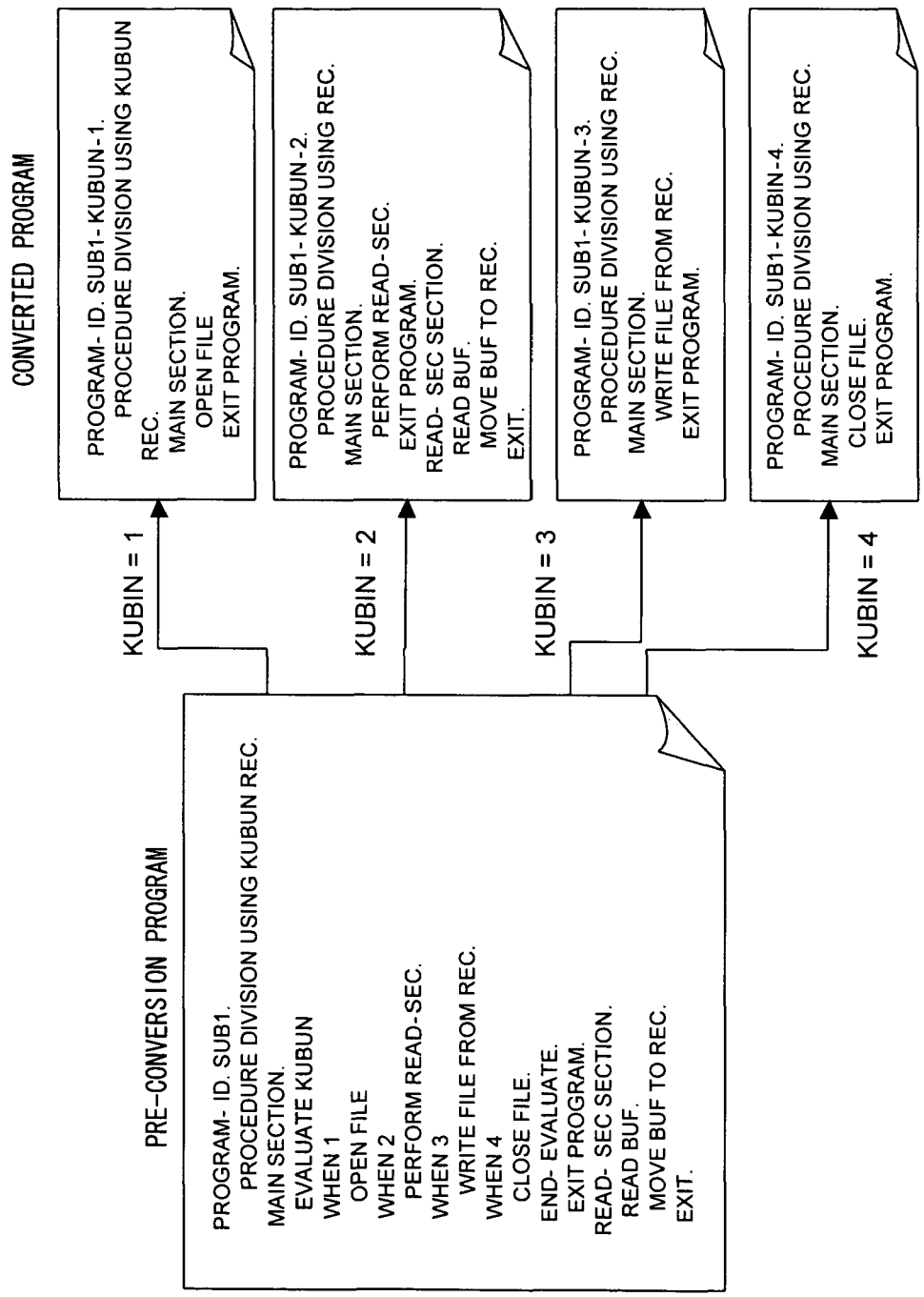
FIG. 8 is a source code showing an example of a program before conversion and a converted program in the first dedicated subroutine generating process according to the present invention.

FIG. 8 is a source program showing an example of a pre-conversion program and a converted program in the first dedicated subroutine generating process according to the present invention. In this example, the pre-conversion program is the call destination program of FIG. 1. The dedicated subroutine displaying only the process content to be executed for each value of the process partition argument is generated by the above-mentioned first dedicated subroutine generating process, and outputted as the converted program.

Figure 9:
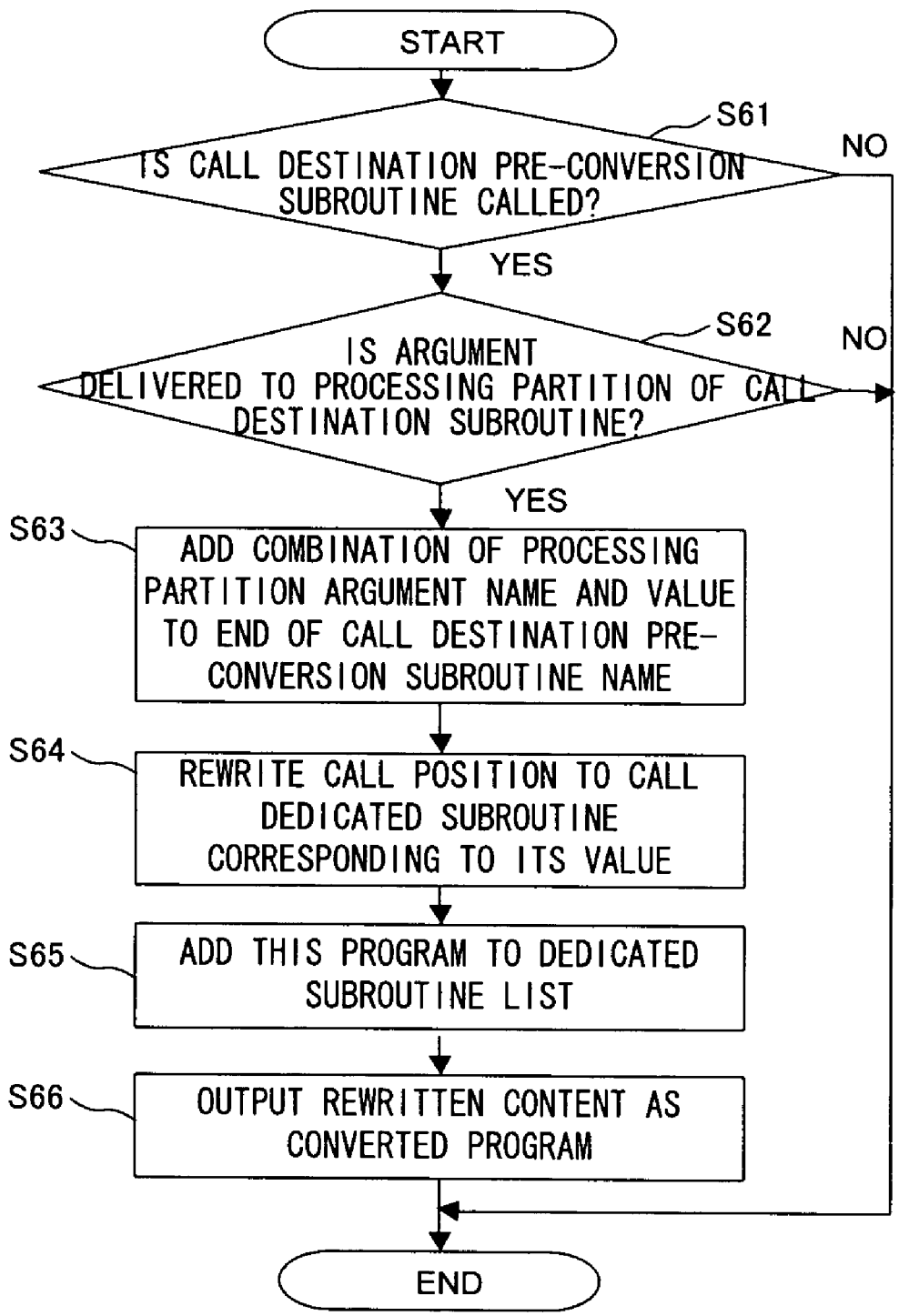
FIG. 9 is a flowchart showing an example of an operation of a second dedicated subroutine generating process according to the present invention.

FIG. 9 is a flowchart showing an example of an operation of a second dedicated subroutine generating process according to the present invention. Here, a pre-conversion subroutine to be an object of the dedicating subroutine generating process is called an object pre-conversion subroutine. The pre-conversion subroutine that is the call destination of the object pre-conversion subroutine is called a call destination pre-conversion subroutine. The dedicated subroutine generated based on the call destination pre-conversion subroutine as an origin is called a call destination dedicated subroutine.

First, the dedicated routine generator 13 judges whether the object pre-conversion subroutine calls the call destination pre-conversion subroutine as the origin of the call destination dedicated subroutine (S61). When the call destination pre-conversion subroutine is not called (N in S61), this flow is finished. On the other hand, when the call destination pre-conversion subroutine is called (Y in S61), the dedicated routine generator 13 judges whether the argument to the object pre-conversion subroutine is delivered to the process partition of the call destination dedicated subroutine (S62).

When the argument is not delivered (N in S62), this flow is finished. On the other hand, when the argument is delivered (Y in S62), the dedicate routine generator 13 adds the combination of the process partition argument name and value to the end of the call destination pre-conversion subroutine name. The dedicated routine generator 13 generates the call destination dedicated subroutine name (S63) and rewrites the call position to call the call destination dedicated subroutine name (S64). Then, the dedicated routine generator 13 adds the information of this dedicated subroutine to the dedicated routine list of the dedicated routine list memory 14 (S65). The dedicated routine generator 13 outputs the rewritten content as the converted program (S66), and finishes this flow.

Figure 10:
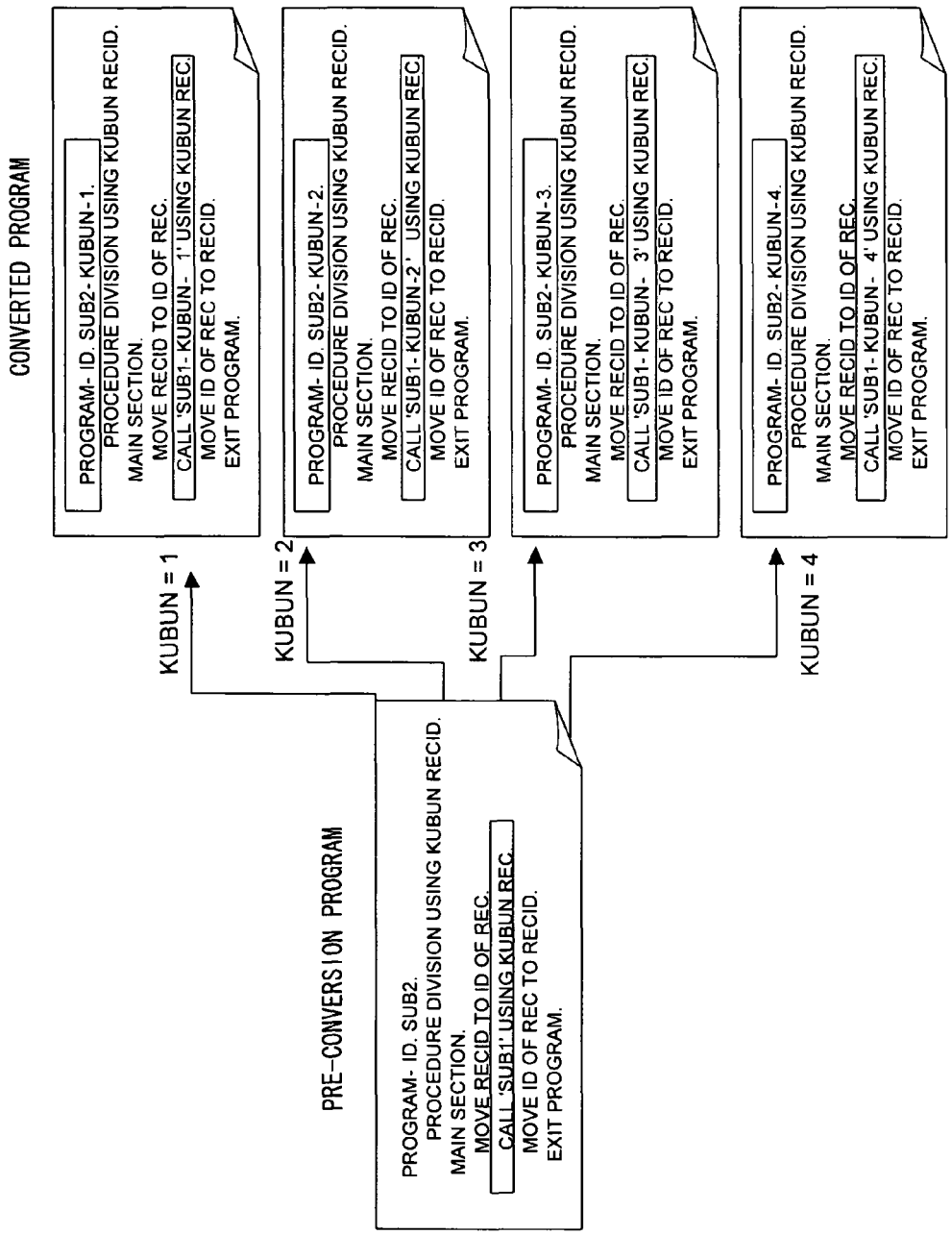
FIG. 10 is a source code showing one example of a program before conversion and a converted program in a second dedicated subroutine generating process according to the present invention.

FIG. 10 is a source code showing an example of the pre-conversion program and the converted program in the second dedicated subroutine generating process. The pre-conversion program of FIG. 10 delivers the argument delivered when called, as the argument when the pre-conversion program of FIG. 8 is called as it is. The dedicated subroutine for calling the corresponding dedicated subroutine is generated for each value of the process partition argument by the above-mentioned second dedicated subroutine generating process, and is outputted as the converted program.

FIG. 11 is a table showing an example of the dedicated routine list according to the present invention. The dedicated routine list stored in the dedicated routine list memory 14 has items of a routine name, an argument position, a value, and a rewriting routine name. These items are stored with the process partition argument for each value. The routine name displays the subroutine name in the pre-conversion program. The argument position displays the position of the process partition argument to be an object of the arguments in the call destination program. The value displays the value of the process partition argument to become an object. The rewriting routine name displays the subroutine name in the output program, generated by the dedicated routine generator 13.

When the source of the subroutine is not obtained, or when the subroutine is described in another language and cannot be analyzed, the process thus far is not executed, but the dedicated routine list is formed in the outside, and is given. Then, the following process may be executed. Furthermore, the content of the dedicated routine list is presented to a user. Instead of the automatically generated routine name, the routine name is changed to a routine name which displays accurately the content by the user. Then, the following process may be executed.

The call position rewriting process will be described.

Figure 12:
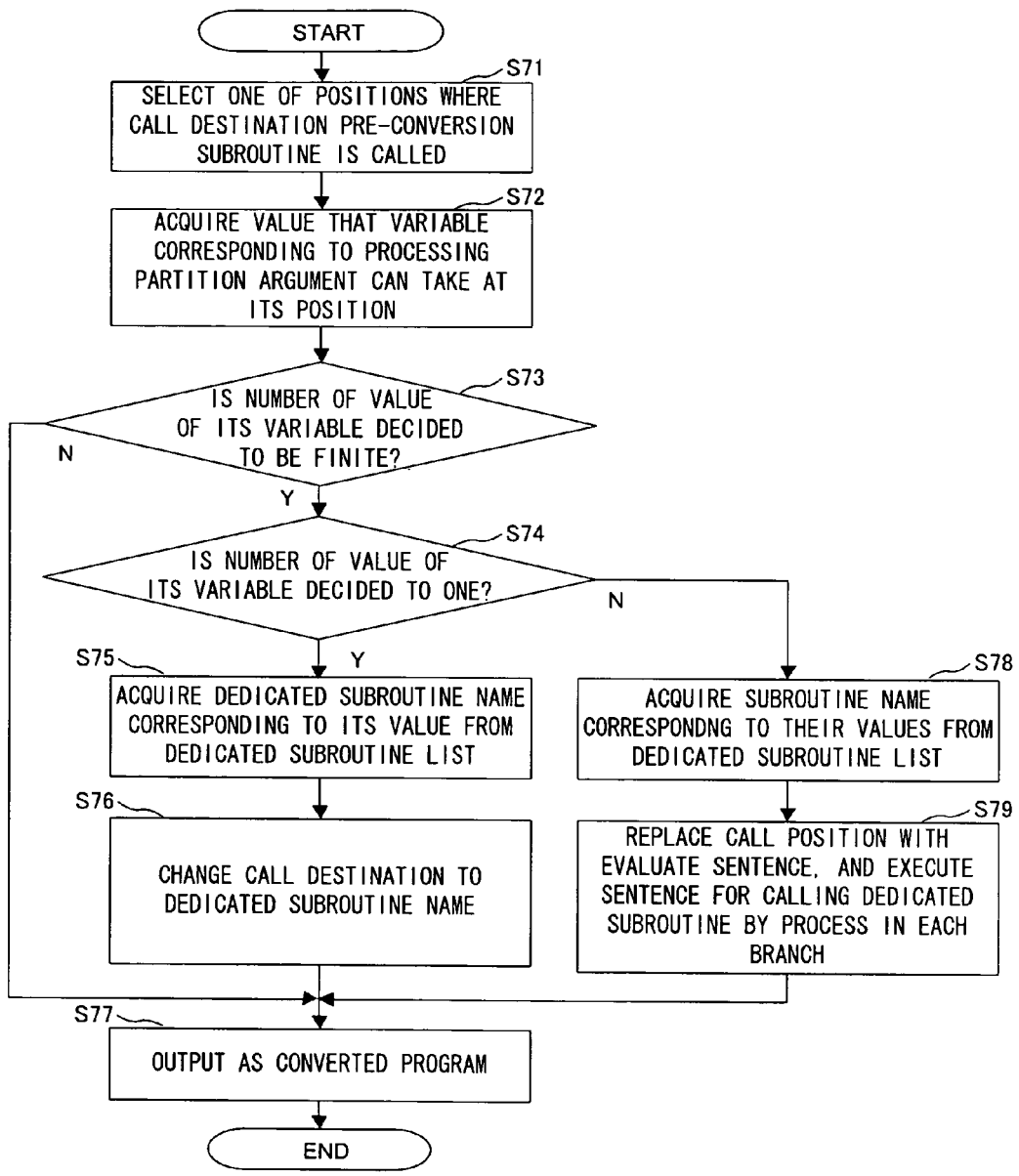
FIG. 12 is a flowchart showing an example of an operation of a call position rewriting process according to the present invention.

FIG. 12 is a flowchart showing an example of the call position rewriting process according to the present invention.

Here, the pre-conversion program as the object of the call position rewriting process is called an object pre-conversion program. The pre-conversion subroutine of the call destination of the object pre-conversion program is called a call destination pre-conversion subroutine. The dedicated subroutine generated based on the call destination pre-conversion subroutine is called a call destination dedicated subroutine.

First, the call position rewriting unit 22 selects one of the positions calling the call destination pre-conversion subroutine, detected by the call position detector 21 (S71). Then, the call position rewriting unit 22 goes back from the selected call position along an executing route, and obtains the value that the variable can take, corresponding to the process partition argument at the call position (S72). The call position rewriting unit 22 judges whether the number of the values that the variable can take is determined to be finite (S73). When the number of the values is not determined to be finite (N in S73), the call position rewriting unit 22 shifts to the process S77. On the other hand, when the number of the values is determined to be finite (Y in S73), the call position rewriting unit 22 judges whether the number of the values that the variable can take is determined to one (S74).

When the number of values is determined to one (Y in S74), the call position rewriting unit 22 acquires the dedicated subroutine name corresponding to the value of the variable from the dedicated routine list stored in the dedicated routine list memory 14 (S75). Then, the call position rewriting unit 22 rewrites the call destination pre-conversion subroutine name in the call position to the dedicated subroutine name (S76) and outputs the dedicated subroutine name as the converted program (S77). The call position rewriting unit 22 then finishes this flow.

Figure 13:
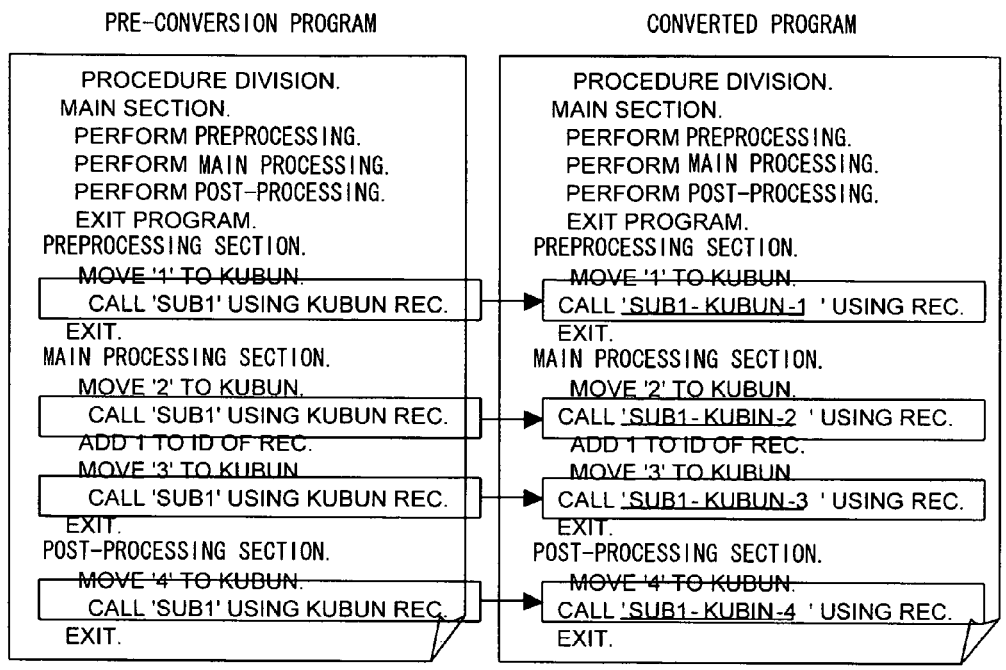
FIG. 13 is a source code showing an example of a converted program outputted by the call position rewriting process according to the present invention.

FIG. 13 is a source code showing an example of the converted program outputted by the call position rewriting process according to the present invention. FIG. 13 displays the case that the number of the values that the variable can take, corresponding to the process partition argument is determined to be one.

On the other hand, the number of the values that the variable can take is not determined to be one (N in S74), the call position rewriting unit 22 acquires the dedicated subroutine name corresponding to the value of the variable from the dedicated routine list stored in the dedicated routine list memory 14 (S78). Then, the call position rewriting unit 22 rewrites the call position to EVALUATE sentence, and rewrites to execute the sentence for calling the dedicated subroutine by the process in each branch (S79). The call position rewriting unit 22 then shifts to the process S77.

FIG. 14 is a source code showing an example of the pre-conversion program that the number of the values of the process partition argument according to the present invention becomes plural. FIG. 15 is a source code showing an example of the converted program outputted by the call position rewriting process according to the present invention. In this example, the values that the variable can take, corresponding to the process partition argument can be limited to 2 and 3. Accordingly, the call position rewriting unit 22 rewrites to the process for calling the dedicated subroutine by the branch. Further, the call position rewriting unit 22 adds where in the converted program the value of the process partition is set as a comment as shown in FIG. 15. However, this comment may not always be added.

Figure 16:
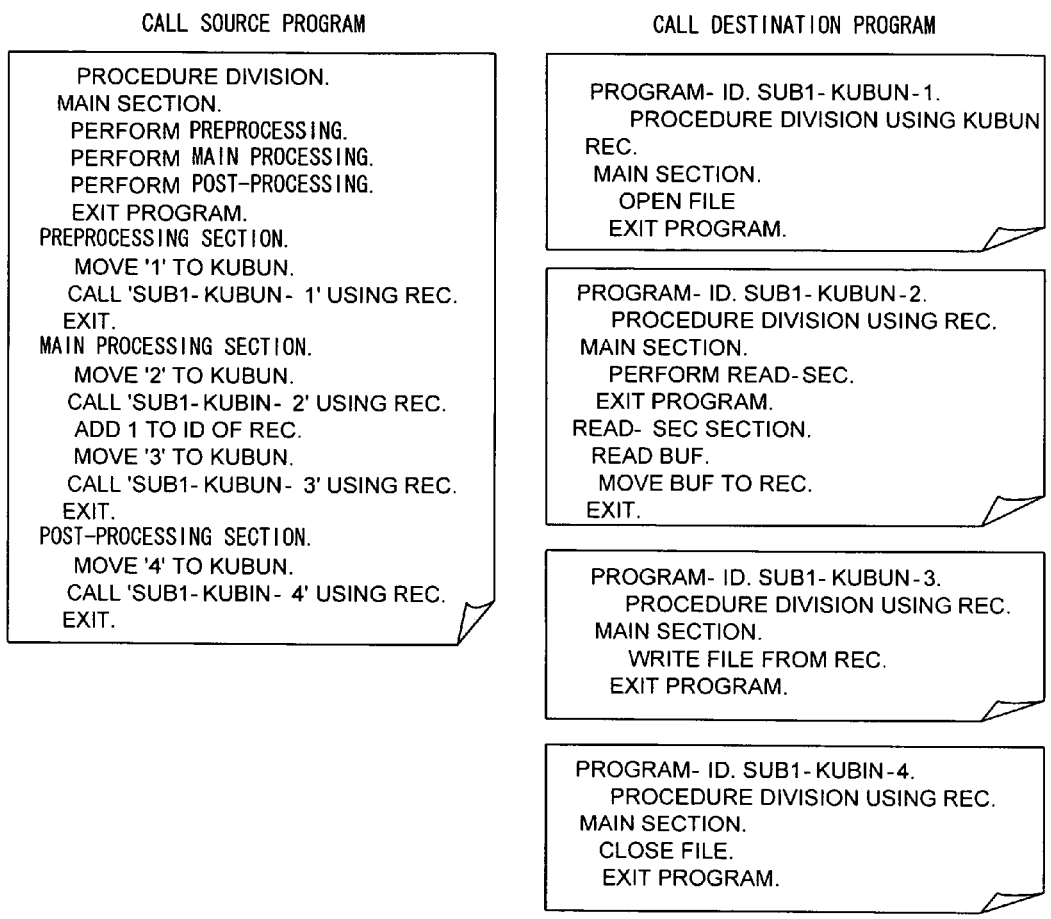
FIG. 16 is a source code showing an example of a converted program outputted by the program conversion apparatus according to the present invention.

FIG. 16 is a source code showing an example of the converted program outputted by the program conversion apparatus according to the present invention. This converted program is obtained by the program conversion apparatus from the conversion source program of FIG. 1. The converted program includes the converted program of FIG. 13 of the call source program and the converted program of FIG. 8 of the call destination program. The call destination program is displayed as the dedicated subroutine for each value of the process partition. Thereby, the call destination program becomes a program that the grasp of the process content is easy.

Figure 17:
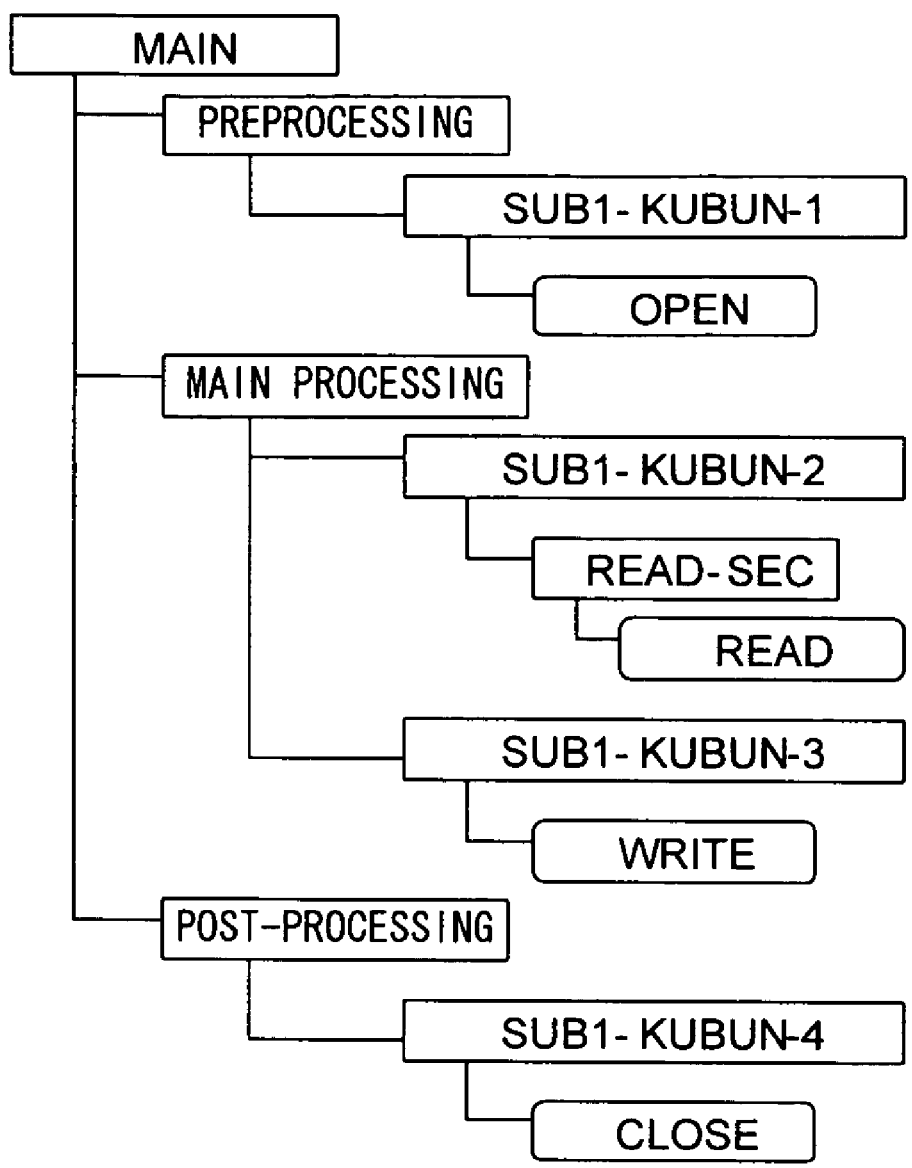
FIG. 17 is a view showing an example of call relation diagram obtained by inputting a converted program to a call relation diagram generation tool according to the present invention.
Figure 19:
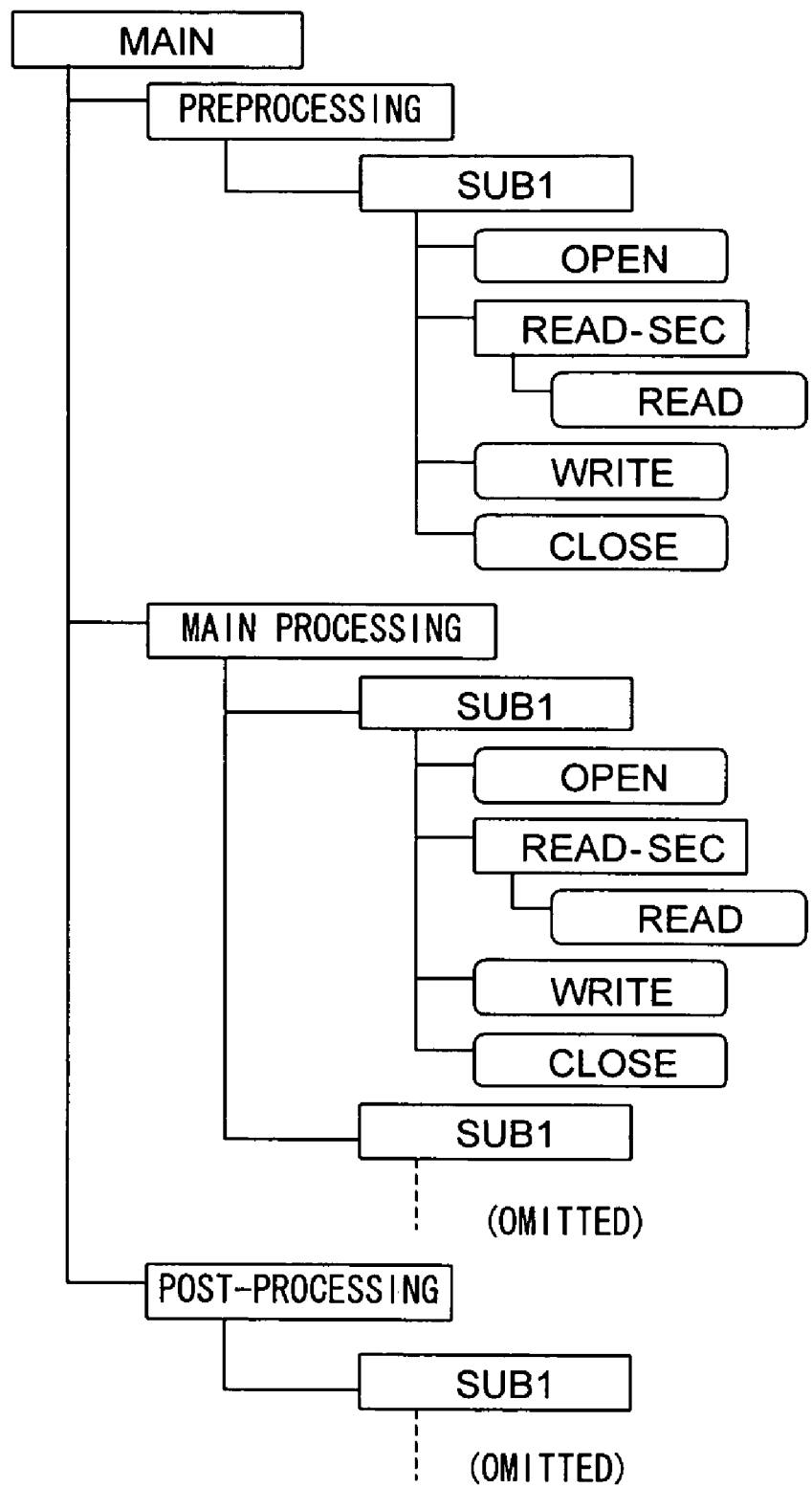
FIG. 19 is a view showing an example of a call relation diagram displayed by a conventional reverse engineering tool.

Furthermore, the call relation diagram is formed from the converted program by using the call relation diagram generation tool. Thereby, the call relation diagram that the grasp of the process content is easy can be generated. FIG. 17 is a view showing an example of the call relation diagram obtained by inputting the converted program according to the present invention to the call relation diagram generation tool. When the call relation diagram is compared with FIG. 19 showing the call relation diagram generated from the pre-conversion program, only the process content to be executed is displayed. Thereby, the waste display of the call relation diagram is reduced. Simultaneously, the grasp of the process content is facilitated.

Second Embodiment

In the second embodiment, a program conversion apparatus for converting a program written by an object oriented language will be described.

FIG. 18 is a source code showing an example of a converted result by the program conversion apparatus according to the present invention for the program written by the object oriented language. In this example, the case that the program conversion apparatus of the present invention is applied to a method for switching the process content by defining a method of the same name as the method of a superclass, called an override as a subclass, will be described.

In the example of FIG. 18, when a Draw ( ) method of separate processes in the subclass Circle and Box succeeding the superclass figure is defined, the Draw ( ) method called from the AddFigure ( ) depends upon the class of f becoming the argument. The program conversion apparatus in this embodiment generates, similarly to the dedicated subroutine in the first embodiment, a dedicated method AddFigure (Circle f), AddFigure (Box f) corresponding to the respective classes. Further, when the class of the variable corresponding to the argument in the call position of AddFigure ( ) can be specified, similarly to the value of the variable corresponding to the argument in the first embodiment, the process content of the call destination can be specified by adding a cast to call the corresponding dedicated method.

As described above, the program conversion apparatus of the present invention can be operated at not only by the COBOL language described in the first embodiment, but also by other language, such as the object oriented language, etc. described in the second embodiment.

Furthermore, the program for executing the respective steps described above in the computer for constituting the program conversion apparatus can be provided as the program conversion program. The above-mentioned program can be executed by the computer for constituting the program conversion apparatus by storing the program in a recording medium which can be read by the computer. Here, the recording medium which can be read by the computer includes an internal memory device internally mounted in the computer, such as a ROM, a RAM, etc., a portable storage medium, such as a CD-ROM or a flexible disk, a DVD disk, a magnet-optic disk, an IC card, etc., a database for holding a computer program, or other computer and database thereof.

Incidentally, the dedicated call destination program generator corresponds to the argument detector and the dedicated routine generator in the embodiments. Further, the call source program rewriting unit corresponds to the call position detector and the call position rewriting unit in the embodiments. Furthermore, the dedicated call destination program generating step corresponds to the processes S11, S12 and S13 in the embodiment. Moreover, the call source program rewriting step corresponds to the processes S21, S22 and S23 in the embodiment.

What is claimed is:

1. A program conversion method executed by a processor comprising:
    detecting a call destination program, an argument for differentiating processes of the call destination program and a plurality of contents of the argument from a program group, the program group including a call source program and the call destination program, the program group having a plurality of different processes of the call destination program according to a plurality of contents of an argument used by the call source program for calling the call destination program;
    generating a plurality of dedicated call destination programs, each of the plurality of dedicated call destination programs executing only one process of the plurality of different processes of the call destination program for each content of the plurality of contents of the argument;
    detecting a call position for calling the call destination program included in the call source program; and
    rewriting data of the detected call position to call one dedicated call destination program of the plurality of the dedicated call destination programs, the one dedicated call destination program executing only one process for one content of the argument of the call position.

2. The program conversion method according to claim 1, wherein
    the detecting a call position detects a value that the argument can take and that is used to call the call destination program in the call source program, and when the value that the argument can take can be limited, the rewriting rewrites the call position to call the dedicated call destination program corresponding to each value that the argument can take.

3. The program conversion method according to claim 1, wherein
    the detecting a call destination program, an argument and a plurality of contents of argument, the generating, the detecting a call position, and the rewriting include using the dedicated call destination program name generated according to the argument and the content of the argument.

4. The program conversion method according to claim 1, wherein
    the generating generates the plurality of dedicated call destination programs by deleting the process which is not executed according to the content of the argument of the content of the call destination program.

5. The program conversion method according to claim 1, wherein
    each of the plurality of contents of the argument is a value of the argument, the plurality of call destination programs are different from each other in the process according to the value of the argument, and the generating generates the plurality of dedicated call destination programs for each value of the argument.

6. The program conversion method according to claim 1, wherein
    each of the plurality of contents of the argument is a class of the argument, the plurality of call destination programs are different from each other in the process according to the class of the argument, and the generating generates the plurality of dedicated call destination programs for each class of the argument.

7. A program conversion apparatus having a processor comprising:
    a computer storage database that stores a program group including a call source program and a call destination program, the program group having a plurality of different processes of the call destination program according to a plurality of contents of an argument used by the call source program for calling the call destination program;
    dedicated call destination program generation means for detecting the call destination program, an argument for differentiating the processes of the call destination program and the plurality of contents of the argument from the program group, and -generating a plurality of dedicated call destination programs, each of the plurality of dedicated call destination programs executing only one process of the plurality of different processes of the call destination program, for each content of the plurality of contents of the argument; and
    call source program rewriting means for detecting a call position for calling the call destination program included in the call source program, and rewriting data of the detected call position to call one dedicated call destination program of the plurality of the dedicated call destination programs, the one dedicated call destination program executing only one process for one content of the argument of the call position.

8. The program conversion apparatus according to claim 7, wherein
    the call destination program rewriting means detects the value that the argument can take and that is used for calling the call destination program in the call source program, and thereby, when the value that the argument can take can be limited, the call source program rewriting means rewrites the call position to call the dedicated call destination program corresponding to each value that the argument can take.

9. The program conversion apparatus according to claim 7, wherein
    the dedicated call destination program generation means and the call source program rewriting means use the dedicated call destination program name generated according to the argument and the content of the argument.

10. The program conversion apparatus according to claim 7, wherein
    the dedicated call destination program generation means generates the plurality of dedicated call destination programs by deleting the process which is not executed according to the content of the argument of the content of the call destination program.

11. The program conversion apparatus according to claim 7, wherein
    each of the plurality of contents of the argument is a value of the argument, the plurality of call destination programs are different from each other in the process according to the value of the argument, and the dedicated call destination program generation means generates the plurality of dedicated call destination programs for each value of the argument.

12. The program conversion apparatus according to claim 7, wherein
    each of the plurality of contents of the argument is a class of the argument, the plurality of call destination programs are different from each other in the process according to the class of the argument, and the dedicated call destination program generation means generates the plurality of dedicated call destination programs for each class of the argument.

13. A non-transitory computer-readable medium having recorded thereon a program conversion program that causes a computer to execute a process comprising:

detecting a call destination program, an argument for differentiating processes of the call destination program, and a plurality of contents of the argument from a program group, the program group including a call source program and the call destination program, the program group having a plurality of different processes of the call destination program according to a plurality of contents of an argument used by the call source program for calling the call destination program;

generating a plurality of dedicated call destination programs, each of the plurality of dedicated call destination programs executing only one process of the plurality of different processes of the call destination program, for each content of the plurality of contents of the argument;

detecting a call position for calling the call destination program included in the call source program; and rewriting data of the detected call position to call one dedicated call destination program of the plurality of the dedicated call destination programs, the one dedicated call destination program executing only one process for one content of the argument of the call position.

14. The computer-readable medium according to claim 1, wherein the detecting a call position detects a value that the argument can take and that is used for calling the call destination program in the call source program, and when the value that the argument can take can be limited, the rewriting rewrites the call position to call the dedicated call destination program corresponding to each value that the argument can take.

15. The computer-readable medium according to claim 1, wherein the detecting a call destination program, an argument and a plurality of contents of the argument, the generating, the detecting a call position, and the rewriting include using the dedicated call destination program name generated according to the argument and the content of the argument.

16. The computer-readable medium according to claim 1, wherein the generating generates the plurality of dedicated call destination programs by deleting the process which is not executed according to the content of the argument from the contents of the call destination program.

17. The computer-readable medium according to claim 1, wherein each of the plurality of contents of the argument is a value of the argument, the plurality of call destination programs are different from each other in the process according to the value of the argument, and the generating generates the plurality of dedicated call destination programs for each value of the argument.

18. The computer-readable medium according to claim 1, wherein each of the plurality of contents of the argument is a class of the argument, the plurality of call destination programs are different from each other in the process according to the class of the argument, and the generating generates the plurality of dedicated call destination programs for each class of the argument.

* * * * *